(12) United States Patent
Diggins

(10) Patent No.: US 9,536,171 B2
(45) Date of Patent: Jan. 3, 2017

(54) LOGO DETECTION BY EDGE MATCHING

(71) Applicant: Snell Limited, Reading, Berkshire (GB)

(72) Inventor: Jonathan Diggins, Lovedean (GB)

(73) Assignee: Snell Limited, Berkshire (GB)

( * ) Notice: Subject to any disclaimer, the term of this patent is extended or adjusted under 35 U.S.C. 154(b) by 0 days.

(21) Appl. No.: 14/710,314

(22) Filed: May 12, 2015

(65) Prior Publication Data

US 2015/0332113 A1 Nov. 19, 2015

(30) Foreign Application Priority Data

May 13, 2014 (GB) .................................. 1408461.0

(51) Int. Cl.
| | |
|---|---|
| *G06K 9/48* | (2006.01) |
| *G06K 9/46* | (2006.01) |
| *G06K 9/62* | (2006.01) |
| *G06T 7/20* | (2006.01) |
| *G06T 7/00* | (2006.01) |
| *H04N 5/272* | (2006.01) |
| *G06K 9/50* | (2006.01) |

(52) U.S. Cl.
CPC ........... *G06K 9/4604* (2013.01); *G06K 9/4609* (2013.01); *G06K 9/50* (2013.01); *G06K 9/6212* (2013.01); *G06K 9/6267* (2013.01); *G06T 7/0044* (2013.01); *G06T 7/204* (2013.01); *H04N 5/2723* (2013.01); *G06K 2209/25* (2013.01); *G06T 2207/10016* (2013.01); *G06T 2207/30221* (2013.01); *G06T 2207/30236* (2013.01)

(58) Field of Classification Search
CPC ..... G06K 9/6267; G06K 9/4604; G06T 7/204; G06T 7/0044

USPC ........................................................ 382/199
See application file for complete search history.

(56) References Cited

U.S. PATENT DOCUMENTS

| | | | |
|---|---|---|---|
| 6,267,296 B1 | 7/2001 | Ooshima et al. | |
| 2012/0263385 A1* | 10/2012 | van Zwol ............ | G06K 9/6202 |
| | | | 382/201 |

FOREIGN PATENT DOCUMENTS

| | | |
|---|---|---|
| EP | 1156444 | 11/2001 |
| WO | 2014046918 | 3/2014 |

OTHER PUBLICATIONS

Hollander et al., "Logo Recognition in Video Stills by String Matching", Proc International Conference on Image Processing 2003 (ICIP 2003), vol. 3, pp. 517-520 (Date of Conference Sep. 14-17, 2003).
United Kingdom Patent Application No. GB 1408461.0 Search Report, dated Oct. 23, 2014 (1 page).
EP15164930.8 Extended European Search Report dated Feb. 16, 2016 (8 pages).

(Continued)

*Primary Examiner* — Ruiping Li
(74) *Attorney, Agent, or Firm* — Michael Best & Friedrich LLP

(57) ABSTRACT

To detect the presence of a logo in a search image, the positions of edges, in an image of the logo and in the search image, are represented by ratios of distances between the respective edge and a plurality of preceding edges. This can be carried out both horizontally and vertically. A sequence of edges at a selected position in the logo image is then compared with sequences of edges from a plurality of positions in the search image, and the position of the logo in the search image is determined from the position of a match between the respective sequences of edges.

8 Claims, 10 Drawing Sheets

(56) References Cited

OTHER PUBLICATIONS

Extended European Search Report for Application No. 15164930.8 dated May 27, 2016 (14 pages).
Psyllos et al., "Vehicle Logo Recognition Using a SIFT-Based Enhanced Matching Scheme", IEEE Transactions on Intelligent Transportation Systems, vol. 11, No. 2, 2010, pp. 322-328.
Ballard, "Generalizing the Hough Transform to Detect Arbitrary Shapes", Pattern Recognition, vol. 13, No. 2, 1981, pp. 111-122.
Ferrari et al., "From Images to Shape Models for Object Detection", International Journal of Computer Vision, vol. 87, No. 3, 2010, pp. 284-303.

\* cited by examiner

LOGO DETECTION BY EDGE MATCHING

FIELD OF INVENTION

This invention concerns image processing to detect previously-defined image elements.

BACKGROUND OF THE INVENTION

The superimposition of graphic elements such as textual or graphical 'logos' onto video images is common. Typically the objective is to 'brand' or identify a particular channel or video source, or simply to add advertising material. The superimposed elements are usually located at a fixed position relative to the image frame; they may be opaque or transparent, stationary or moving. However, the superimposed elements are intended to be recognised by a viewer, and therefore will have predetermined form unrelated to the images to which they are applied. The term logo will be used henceforth in this specification to refer to these superimposed elements.

It is highly advantageous for the presence of particular logos to be identified in an automatic monitoring system for a video content production and/or distribution system. This is essentially a pattern recognition problem, which is complicated by the completely unknown nature of the background behind the logo. And, a given logo pattern to be recognised may be a sampled image with an unknown spatial relationship to the sampling of the image in which it has to be detected.

Known methods that can be used to detect logos in video images include correlation, either in the spatial domain, or the spatial frequency domain. There are a number of algorithms for identifying 'feature points' or singularities in images; the positions of feature points in an image in which a logo may be present can be compared with the positions of feature points in an image comprising only the logo to be detected.

Known techniques require significant processing resources that limit their application. There is thus a need for an alternative approach based on a simpler method of image analysis.

SUMMARY OF THE INVENTION

The invention consists in methods and apparatus for comparing a logo image with a search image so as to detect the presence in the search image of a logo portrayed in the logo image wherein
  the relative positions of edges within a sequence of edges along a first spatial sampling direction in the logo image
are compared with
  the relative positions of edges within a sequence of edges along a first spatial sampling direction in the search image.

Suitably, a sequence of edges at a selected position in the logo image is compared with sequences of edges from a plurality of positions in the search image and the position of the portrayed logo in the search image is determined from the position of a match between the respective sequences of edges.

Advantageously, a scaling factor of the logo image relative to the search image in the direction of the said sequence is determined.

In preferred embodiments, first and second logo image boundary positions are calculated from each matched sequence and respective frequency of occurrence measures are calculated for quantised values of first and second logo image boundary positions.

And, a logo image width is calculated from each matched sequence and widths are summed for each quantised value of first logo image boundary position and for each quantised value of second logo image boundary position.

And, a detected logo size and position is derived from an associated pair of first and second logo image boundary positions selected according to the difference between their respective quantised positions and their associated sums of width values.

In certain embodiments, the frequency of occurrence of matches between sequences of edges along a first spatial sampling direction in the logo image is analysed according the position of the respective match along a second spatial sampling direction in the logo image.

And, match data associated with frequently occurring match positions is used to derive a logo size and position from an associated pair of first and second logo image boundary positions along the said second spatial sampling direction.

In a preferred embodiment, the presence in the search image of a logo portrayed in the logo image is detected when a weighted measure of the number of matches between sequences of edges at selected positions in the logo image and sequences of edges within a region in the search image bounded by detected logo image boundary positions exceeds a threshold.

DETAILED DESCRIPTION OF THE INVENTION

Figure 1:
FIG. 1 shows an exemplary logo.

The detection of the logo shown in FIG. 1 according to an example of the invention will now be described. It is assumed that both the logo and the 'search image' in which it is to be detected are available as sampled images represented by the luminance values of pixels at positions on an orthogonal spatial sampling grid. However, as will be explained later, the invention is not limited to orthogonal sampling, and other values describing pixel characteristics can be used. Note that, other than the fact that both sampling grids are orthogonal, there is no assumed correspondence between the sampling of the logo image and the sampling of the search image.

Prior to the detection process the logo image is analysed to find a 'signature' that characterises it. The signature describes the positions of edges in the logo image that lie on a chosen set of horizontal lines across the logo image and a chosen set of vertical lines across the logo image. In the present example seven equally-spaced horizontal lines and seven equally-spaced vertical lines are chosen. The positions of these lines should preferably be aligned with the sampling grid of the logo image, so that pixel values corresponding to positions on the lines are readily available without recourse to interpolation. In this case the horizontal lines correspond to chosen rows of pixels, and the vertical lines correspond to chosen columns of pixels.

The edge positions are detected by respective one-dimensional analyses along each of these horizontal and vertical lines. In the following explanation the analysis along horizontal lines through the logo image will be described first; followed by description of the analogous vertical process.

Edges are detected by the application of a horizontal spatial high-pass filter. A suitable filter is given by equation 1.

$$E(i) = \frac{1}{2}|Y(i-1) - Y(i+1)| \quad [1]$$

Where:
i is an index that describes the horizontal position of a pixel, expressed in units of the spatial sampling pitch of the logo image, from the left hand side of the logo image;
E(i) is the filter output at pixel i;
Y(i−1) and Y(i+1) are the values of the pixels horizontally adjacent to pixel i; and,
|x| indicates the magnitude of x.

The filter includes rectification (taking the magnitude), so as to give a positive output for both leading and trailing edges. Edge positions are identified where the filter output both exceeds a threshold and is a local maximum. A suitable criterion is given by the logical expression 2 that uses the values of four adjacent pixels.

$$E(i) > T_{edge} \text{ AND}$$

$$E(i-1) < E(i) \text{ AND}$$

$$\{E(i) > E(i+1)\} \text{ OR } \{[E(i) = E(i+1)] \text{ AND } [E(i+1) > E(i+2)]\} \quad [2]$$

Where: $T_{edge}$ is the edge detection threshold.

It is helpful to determine the edge positions with sub-pixel precision, that is to say on a spatial scale that is not quantised by the logo image's pixel structure. This can be done by summing the moments of the filter outputs for a set of adjacent pixels including the pixel detected as an edge pixel. A suitable method is defined by equation 3.

$$P(i) = [(i-1) \times E(i-1) + i \times E(i) + (i+1) \times E(i+1)] + [E(i-1) + E(i) + E(i+1)] \quad [3]$$

Where: P(i) is the sub-pixel-precision position of the edge detected at pixel i relative to the left hand boundary of the logo image.

These horizontal positions are used to form a first part of the logo signature as follows.

Figure 2:
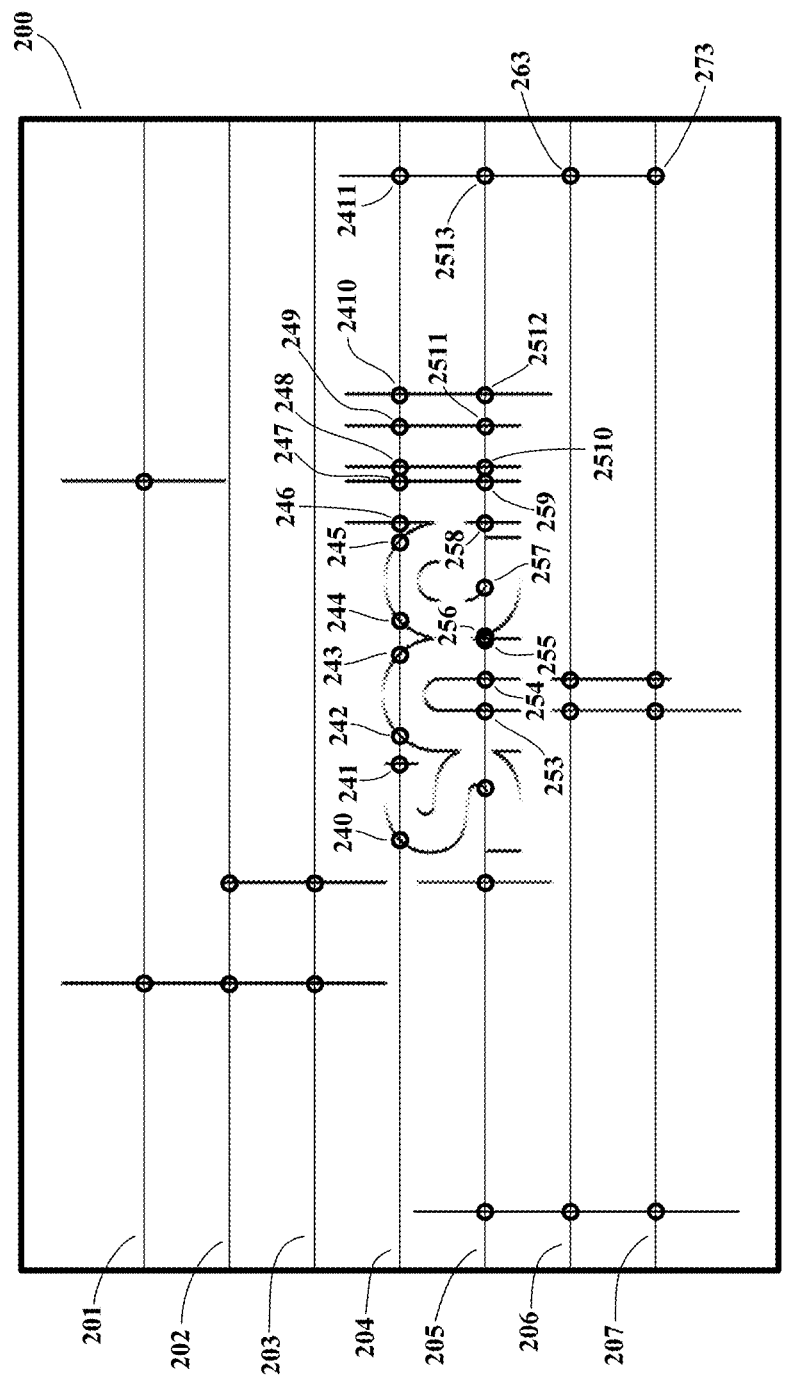
FIG. 2 illustrates horizontal analysis of the FIG. 1 logo according to an embodiment of the invention.

FIG. 2 shows the edges detected by horizontal filtering of the logo of FIG. 1. The boundary of the logo image is shown by the thick border (200); this boundary is chosen to be a little larger than the logo itself, so as to include all the outside edges of the logo. Seven horizontal lines (201) to (207) are shown, equally spaced over the height of the logo. Detected edges lying on these lines are indicated by circles, for example the diagonal edge (240) and the vertical edge (2411) lying on the line (204). Note that all edges detected by horizontal filtering are shown in the Figure for clarity. In a practical implementation of the invention, only the pixels lying on the seven horizontal lines (201) to (207) would be processed to detect edges.

The horizontal characterisation of the logo proceeds by following along each of the seven horizontal lines in turn, from left to right. Only edges that are preceded by three or more other edges on the same horizontal line contribute to the logo signature. The lines (201) (202) and (203) have only two edges each, and are thus ignored. The positions of the remaining lines (204) to (207), and the respective values of P(i) for edges preceded by three or more edges, form the first part of the signature of the FIG. 1 logo. The positions of the lines are expressed as the distance between the top of the logo image (the top boundary of the frame (200)) and the relevant line; this vertical distance is expressed in units of the pitch between vertically adjacent pixels of the logo image.

Figure 3:
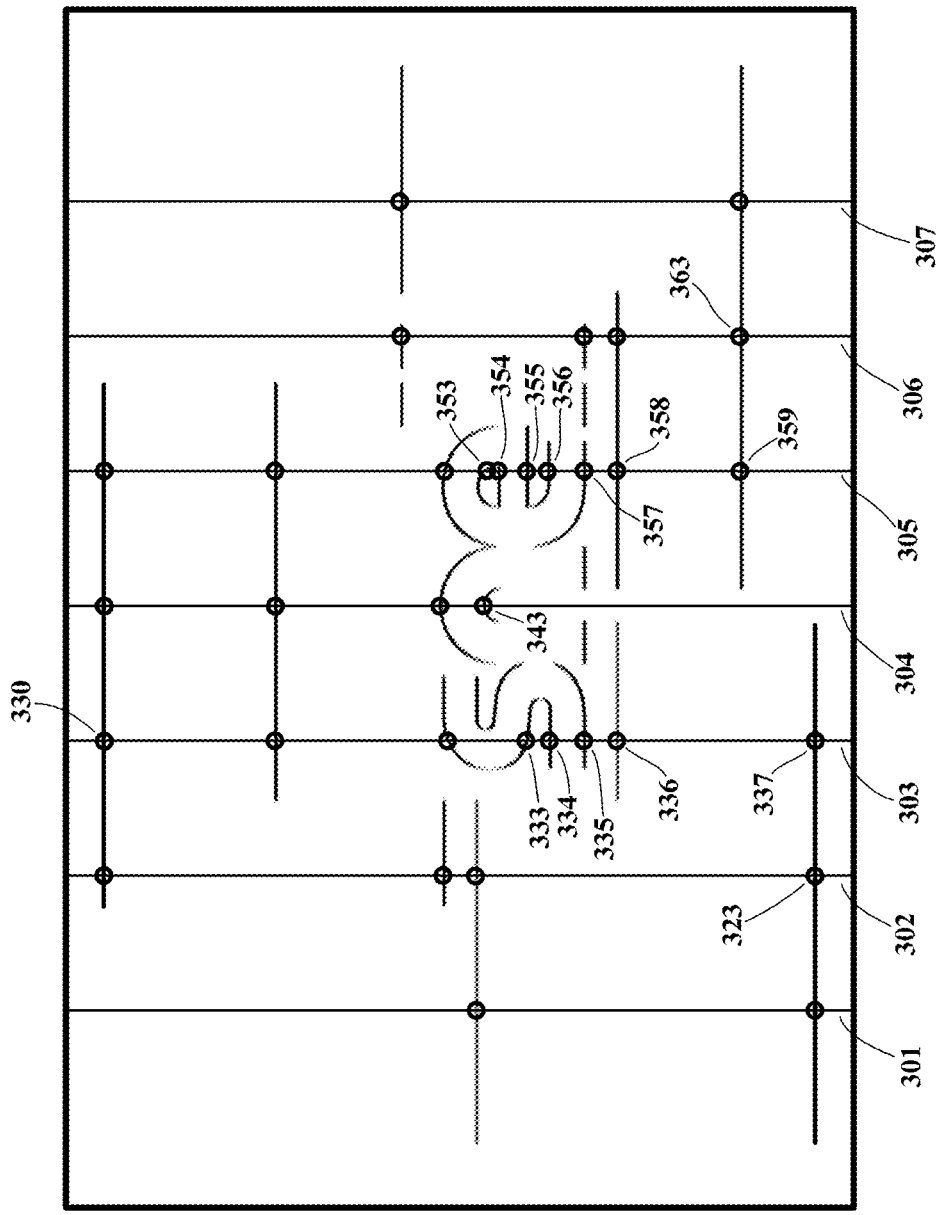
FIG. 3 illustrates vertical analysis of the FIG. 1 logo according to an embodiment of the invention.

The second part of the logo signature describes edges detected by vertical analysis. FIG. 3 shows the edges of the FIG. 1 logo as identified by a vertical high-pass filter. Seven vertical lines (301) to (307), equally distributed across the horizontal extent of the logo, intersect edges at the positions marked by circles, such as the circle (330). Proceeding from top to bottom, only the lines (302) (303) (304) (305) and (306) have edges that are preceded by three or more other edges on the same line. The vertical positions of these edges with respect to the top boundary of the logo image, and the respective horizontal positions of the lines on which they were detected form the vertical part of the logo signature. The vertical positions of the edges are expressed, with sub-pixel precision, in units of the vertical sampling pitch of the logo image; and, the horizontal positions of the lines (302) (303) (304) (305) and (306) are expressed as distances from the left boundary of the logo image (the left boundary of the frame 200) in units of the horizontal sampling pitch of the logo image.

The logo of FIG. 1 is thus characterised by the positions, with respect to the logo image boundary (200), of seven horizontal lines and seven vertical lines; and, for each of these lines, the positions of edges preceded by three or more edges.

Figure 4:
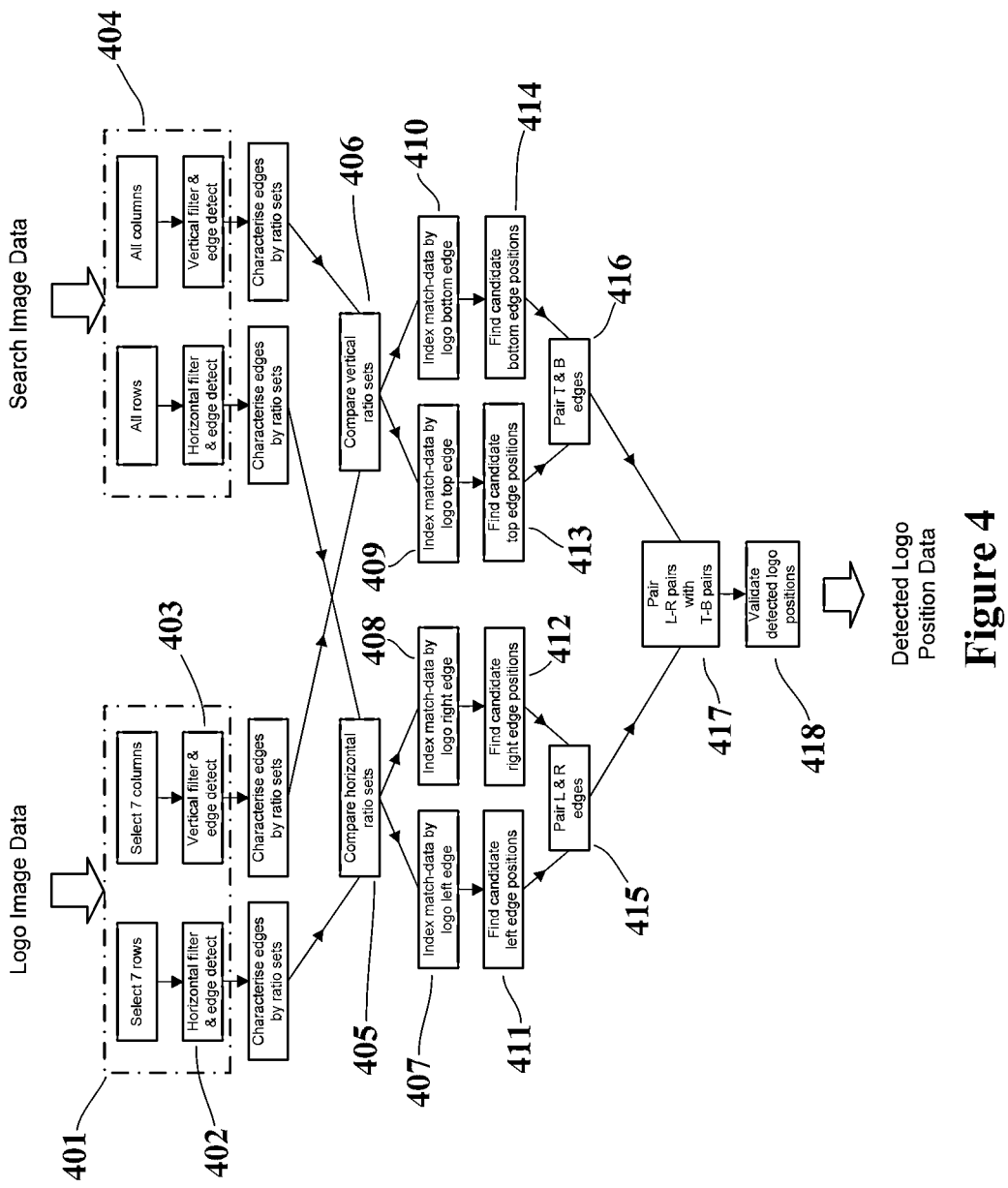
FIG. 4 illustrates a logo detection process according to an embodiment of the invention.

The process of logo detection according to the invention makes use of certain ratios of distances between edges. An exemplary process is illustrated in FIG. 4, and will now be described. The logo signature comprising the edge positions on the seven horizontal lines and seven vertical lines through the logo image is derived (401). Ratios of distances between edges are derived from the logo signature as a first step in a detection process. The derivation (402) of the horizontal distance ratios is as follows.

Referring to FIG. 2, the horizontal line (204) has twelve edges present. The edge (243) is the first edge on the line (204) that is preceded by three other edges. It is characterised by the vertical position of the line on which it lies, that is to say to fourth line from the top of the image; and, a set of ratios of the distances between preceding edges on the same line. Let us denote the distance between the edge to be characterised and the immediately preceding edge by $d_{0,1}$; the distance between the edge to be characterised and the second preceding edge by $d_{0,2}$; and so on.

The edge (243) is then characterised by three ratios of distances between four edges:

| $d_{0,2}:d_{0,1}$ | $d_{0,3}:d_{0,1}$ |
|---|---|
|  | $d_{0,3}:d_{0,2}$ |

Where:
$d_{0,1}$ is the distance between the edge (243) and the edge (242);
$d_{0,2}$ is the distance between the edge (243) and the edge (241); and,
$d_{0,3}$ is the distance between the edge (243) and the edge (240).

The edge (244) is characterised by six ratios of distances between five edges:

| $d_{0,2}:d_{0,1}$ | $d_{0,3}:d_{0,1}$ | $d_{0,4}:d_{0,1}$ |
|---|---|---|
|  | $d_{0,3}:d_{0,2}$ | $d_{0,4}:d_{0,2}$ |
|  |  | $d_{0,4}:d_{0,3}$ |

Where: $d_{0,1}$ is the distance between the edge (244) and the edge (243);
...
$d_{0,4}$ is the distance between the edge (244) and the edge (240).

The edge (245) is characterised by ten ratios of distances between six edges:

| $d_{0,2}:d_{0,1}$ | $d_{0,3}:d_{0,1}$ | $d_{0,4}:d_{0,1}$ | $d_{0,5}:d_{0,1}$ |
|---|---|---|---|
|  | $d_{0,3}:d_{0,2}$ | $d_{0,4}:d_{0,2}$ | $d_{0,5}:d_{0,2}$ |
|  |  | $d_{0,4}:d_{0,3}$ | $d_{0,5}:d_{0,3}$ |
|  |  |  | $d_{0,5}:d_{0,4}$ |

Where: $d_{0,1}$ is the distance between the edge (245) and the edge (244);
...
$d_{0,5}$ is the distance between the edge (245) and the edge (240).

Later edges are characterised by fifteen ratios of distances between seven edges (the relevant edge and the six preceding edges). Thus the edge (246) is characterised by the fifteen ratios:

| $d_{0,2}:d_{0,1}$ | $d_{0,3}:d_{0,1}$ | $d_{0,4}:d_{0,1}$ | $d_{0,5}:d_{0,1}$ | $d_{0,6}:d_{0,1}$ |
|---|---|---|---|---|
|  | $d_{0,3}:d_{0,2}$ | $d_{0,4}:d_{0,2}$ | $d_{0,5}:d_{0,2}$ | $d_{0,6}:d_{0,2}$ |
|  |  | $d_{0,4}:d_{0,3}$ | $d_{0,5}:d_{0,3}$ | $d_{0,6}:d_{0,3}$ |
|  |  |  | $d_{0,5}:d_{0,4}$ | $d_{0,6}:d_{0,4}$ |
|  |  |  |  | $d_{0,6}:d_{0,5}$ |

Where: $d_{0,1}$ is the distance between the edge (246) and the edge (245);
...
$d_{0,6}$ is the distance between the edge (246) and the edge (240).

The edge (247) is characterised by the same fifteen ratios.
Where: $d_{0,1}$ is the distance between the edge (247) and the edge (246);
...
$d_{0,6}$ is the distance between the edge (247) and the edge (241).

And similarly up to the last edge (2411), which is characterised by the same fifteen ratios.

Where: $d_{0,1}$ is the distance between the edge (2411) and the edge (2410);
...
$d_{0,6}$ is the distance between the edge (2411) and the edge (245).

A similar process is applied to the line (205). This has fourteen edges, of which the right-most eleven are characterised. The lines (206) and (207) have four edges each, and so only the right-most edges (263) and (273) are characterised, each by a set of three ratios.

The derivation (403) of the vertical ratio sets will now be described.

Referring to FIG. 3, the lines (302) (303) (304) (305) and (306) have edges that are preceded by three or more other edges on the same line. Proceeding down these lines (the conventional direction of television scanning):
the line (302) has one such edge (323);
the line (303) has five such edges (333) to (337);
the line (304) has one such edge (343);
the line 305 has seven such edges (353) to (359); and,
the line (306) has one such edge (363).

The relative positions of these edges are characterised by sets of ratios of distances between edges, in the same way as for the edges identified by horizontal filtering.

The output of the horizontal distance characterisation process (402) and the vertical distance characterisation process (403) for the FIG. 1 logo is summarised in Table 1 below.

TABLE 1

|  | Line | Edge | Number of ratio sets | Number of ratios |
|---|---|---|---|---|
| Horizontal Analysis | 204 | $4^{th}$ (243) | 1 | 3 |
|  |  | $5^{th}$ (244) | 1 | 6 |
|  |  | $6^{th}$ (245) | 1 | 10 |
|  |  | $7^{th}$ (246) to $12^{th}$ (2411) | 6 | 6 × 15 = 90 |
|  | 205 | $4^{th}$ (253) | 1 | 3 |
|  |  | $5^{th}$ (254) | 1 | 6 |
|  |  | $6^{th}$ (255) | 1 | 10 |
|  |  | $7^{th}$ (256) to $14^{th}$ (2513) | 8 | 8 × 15 = 120 |
|  | 206 | $4^{th}$ (263) | 1 | 3 |
|  | 207 | $4^{th}$ (273) | 1 | 3 |
|  | Totals: |  | 22 | 254 |
| Vertical Analysis | 302 | $4^{th}$ (323) | 1 | 3 |
|  | 303 | $4^{th}$ (333) | 1 | 3 |
|  |  | $5^{th}$ (334) | 1 | 6 |
|  |  | $6^{th}$ (335) | 1 | 10 |
|  |  | $7^{th}$ (336) & $8^{th}$ (337) | 2 | 2 × 15 = 30 |
|  | 304 | $4^{th}$ (343) | 1 | 3 |
|  | 305 | $4^{th}$ (353) | 1 | 3 |
|  |  | $5^{th}$ (354) | 1 | 6 |
|  |  | $6^{th}$ (355) | 1 | 10 |
|  |  | $7^{th}$ (356) to $10^{th}$ (359) | 3 | 3 × 15 = 45 |
|  | 306 | $4^{th}$ (363) | 1 | 3 |
|  | Totals: |  | 14 | 122 |

Note that, although edge positions and ratio sets are specified only for edges preceded by three or more other edges, distances between the preceding three edges contribute to the distance ratios. The data used to detect the logo shown in FIG. 1 thus comprises:
22 edge horizontal positions, and the respective vertical positions of the four horizontal lines on which they lie;
14 edge vertical positions, and the respective horizontal positions of the five vertical lines on which they lie;
36 ratio sets (comprising either: three; six; ten; or, fifteen distance ratios) describing:

58 horizontal relationships between 34 edges at four vertical positions within the logo; and, 52 ratio sets characterising vertical relationships between 30 edges at five horizontal positions within the logo.

The next step in the analysis of a search image to identify the presence and location of the logo is to apply the same horizontal and vertical edge detection and characterisation processes that were applied to the chosen horizontal and vertical lines across the logo image to all the rows of pixels, and all the columns of pixels, of the search image. These processes are shown at (404) in FIG. 4. Edge positions and ratio sets are determined: for horizontally detected edges having three or more preceding edges to their left; and, for vertically detected edges having three or more preceding edges above them. All the rows of pixels and all the columns of pixels in the search image are analyzed. The edge positions are expressed relative to the left and top boundaries of the search image, in units of the respective horizontal and vertical spatial sampling pitches of the search image.

In the next stages of the logo detection process, each of the ratio sets derived from horizontal analysis of rows of pixels in the search image is compared (405) with the ratio sets derived from horizontal analysis of the logo signature; and each of the ratio sets derived from vertical analysis of columns of pixels in the search image is compared (406) with the ratio sets derived from vertical analysis of the logo signature. However, these comparison processes can be simplified by rejecting ratio sets from the search image that are derived from distances between edges that correspond to an unexpected size of the logo.

In the tabular presentation of the ratio sets above, the first distance in right-most ratio on the top row of each table is the distance between the most-separated edges that contribute to the respective set; examples are the distance $d_{0,4}$ for the edge (244), and the distance $d_{0,6}$ for the edge (246). Before comparing search image ratio sets with logo image ratio sets, the implied scaling of the logo in the search image is determined from the ratio of this search image distance to the corresponding logo image distance.

Suppose that it is known that any occurrence of the logo image in the search image cannot be larger than $S_{max}$ times the size of the logo image. If the value of $d_{0,4}$ for an edge in the search image preceded by three other edges is more than $S_{max}$ times larger than the value of $d_{0,4}$ for a logo image edge preceded by three other edges, then there is no need to compare the six ratios characterising these edges. The condition that must be met before the relevant ratio sets are compared is thus expressed by the relationship:

$$S=d_{sch}/d_{log}<S_{max} \qquad [4]$$

Where:

$S_{max}$ is the maximum expected logo scale factor in the relevant direction (horizontal or vertical); and, $d_{sch}$ is the distance in search image pixel pitches between the most distant points in a search image ratio set containing the same number of distance ratios; and, $d_{log}$ is the distance in logo image pixel pitches between the most distant points in a logo image ratio set.

In a similar way, edges in the search image corresponding to an unexpectedly small appearance of the logo can be ignored. Thus a second condition that must be met before the relevant ratio sets are compared is:

$$S=d_{sch}/d_{log}>S_{min} \qquad [5]$$

Where: $S_{min}$ is the minimum expected logo scale factor in the relevant direction (horizontal or vertical).

Ratio sets from the search image for which the longest inter-edge distance complies with the above inequalities 5 and 6, and which therefore do not correspond to improbably-scaled points, are compared. The comparison of ratios is simplified by expressing them logarithmically as follows:

$$q_j=40 \log(Q_j) \text{ and} \qquad [6]$$

$$r_j=40 \log(R_j) \qquad [7]$$

Where:

$Q_j$ is a distance ratio within a ratio set derived from the logo image;

$R_j$ is a distance ratio within a ratio set derived from the search image; and, j is an index that identifies a particular ratio within a ratio set.

The comparisons use thresholds which depend on the number of ratios in the relevant set. A detected edge in the search image is considered to match an edge in the logo image when:

$$|q_j-r_j|<\tau_K \text{ for all } j \qquad [8]$$

Where $\tau_K$ is a threshold appropriate to a ratio set of size K.

Suitable threshold values for a system in which the ratios are expressed according to equations [6] and [7] above, using logarithms to base 10, are:

5 for ratio sets comprising three distance ratios (values of j 1, 2 and 3)

5 for ratio sets comprising five distance ratios (values of j 1, 2, 3, 4, and 5)

6 for ratio sets comprising six distance ratios (values of j 1, 2, 3, 4, 5 and 6).

Each matched edge found by horizontal analysis implies a respective horizontal position for the logo within the search image; and, each matched edge from vertical analysis implies a respective vertical position for the logo within the search image. As described above, comparison of respective distances in the search image and the logo image enables the relative scaling of the logo image with respect to its occurrence in the search image to be determined. Combination of a match position with an associated scaling factor enables the positions of at least two boundaries of the logo image in the search image to be determined.

Combination of logo image edge positions and scale factors from many ratio set matches enables a more reliable determination of the position and size of the logo in a search image. However, it is important that the combination of the information from the detected ratio set matches is done in a way that retains the most relevant information, whilst reducing the contributions of the errors that inevitably arise from processing real pixel values that are likely to be contaminated by noise. Respectively averaging all the horizontal positions and scale factors from horizontal analysis and all the vertical positions and scale factors from vertical analysis would not give the best estimate of the size and position of the logo in the search image.

The inventor has appreciated that, if the data about match positions is analysed statistically with respect to the logo image boundary positions inferred by each detected match, then inconsistent data can be rejected. The ratio sets matched in horizontal analysis are analysed in two sets of histograms, one set indexed by the implied position of the left boundary of the logo image in search image, and one set indexed by the implied position of the right boundary of the logo image in the search image. Similarly, for ratio sets matched in vertical analysis, two sets of histograms are constructed, respectively indexed by the inferred top and bottom positions of the logo image in the search image.

The inferred position of the preceding boundary of the logo image (left boundary for horizontal analysis, top boundary for vertical analysis) in the search image is:

$$P_S - (P_L \times S) \quad [9]$$

Where:
$P_S$ is the match position in the search image, in units of search image pixel pitches;
$P_L$ is the match position in the logo image, in units of logo image pixel pitches; and,
S is the scale factor (either horizontal or vertical, as appropriate).

Figure 5:
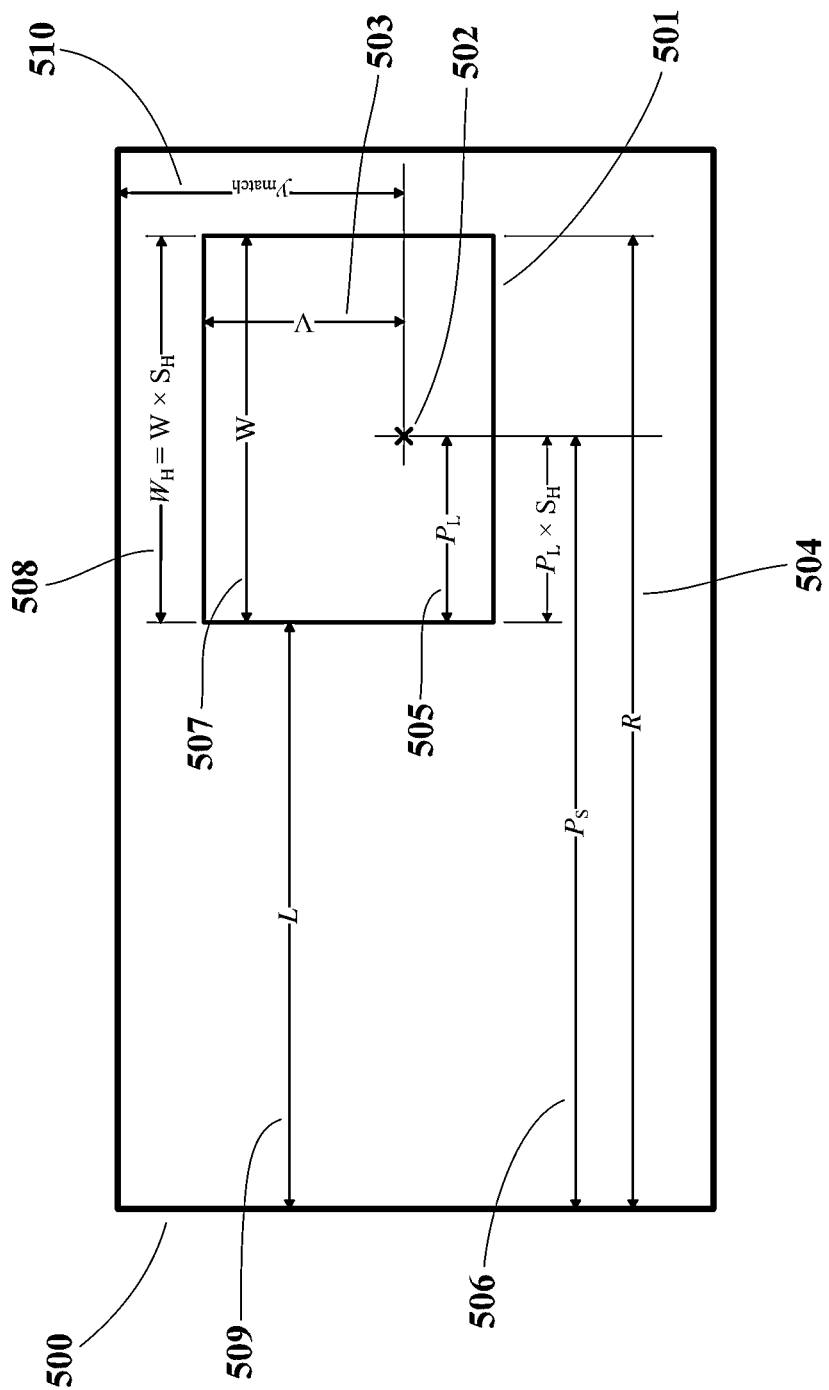
FIG. 5 illustrates the determination of logo image left and right boundary positions in a search image.

This is illustrated in FIG. 5, which shows the position of a logo image (501) within a search image (500). A horizontal ratio set defining an edge at the point (502) in the logo image (501) is matched with a horizontal ratio set derived from the search image (500). The rectangle (501) corresponds to the size and position of the logo image boundary, and it extends beyond the actual logo as explained above. The actual shape of the logo itself is arbitrary; the rectangular logo image boundary (501) is merely a convenient way of defining the size and position of the logo.

FIG. 5 shows various dimensions relating to the logo image and its position within the search image. Dimensions in the Figure which are placed within the logo image boundary (501) are in units of logo image pixel pitches; and, dimensions which are placed outside the logo image boundary (501) are in units of search image pixel pitches. For example, the distance V (503) is expressed in units of the vertical distance between rows of pixels in the logo image; and, the distance R (504) is in units of the horizontal distance between columns of pixels in the search image.

Each horizontal ratio set for which the comparison (405) indicates a match between search image ratios and the respective logo image ratios is characterised by the following match data:
  The position V (503) of the horizontal line across the logo image;
  The horizontal match position a $P_L$ (505) in the logo image;
  The horizontal match position $P_S$ (506) in the search image;
  A weight value w equal to the number of ratios in the matched set; and,
  A horizontal scale value $S_H$ equal to the linear ratio of the respective distances between the most distant points in the matched ratio sets.

$S_H$ is multiplied by the known width W (507) of the logo image, in logo image pixel pitches, to find an inferred width $W_H$ (508) of the logo image, in search image pixel pitches. $W_H$ $P_L$ and $P_S$ are then used to calculate an inferred logo image left boundary position L (509), and an inferred logo image right boundary position R (504).

This match data from the comparison (405) of horizontal ratio sets is analysed in a set of histograms, in which weighted sums of occurrences of match events meeting particular criteria are computed. The values of L and R are used as index values, so that two separate representations of the horizontal match data are formed: one where the data is indexed (407) by the inferred logo left boundary position; and another where the same data is indexed (408) by the inferred logo right boundary position.

For every horizontal match event:
  A logo image left boundary position histogram $H_L$ is incremented by w at index L;
  A logo image right boundary position histogram $H_R$ is incremented by w at index R;
  Two logo image width histograms are incremented by the product $w \times W_H$:
    histogram $H_{WS}$ at index L,
    histogram $H_{WR}$ at index R.

Typically the 'bin width' for the histograms is one pixel; that is to say the inferred logo image boundary positions are quantised to the nearest search image pixel position. Data having index values falling just outside boundary of the search image, say within five pixel pitches or less, can be added to the bins indexed by positions adjacent to the search image boundary.

Figure 6:
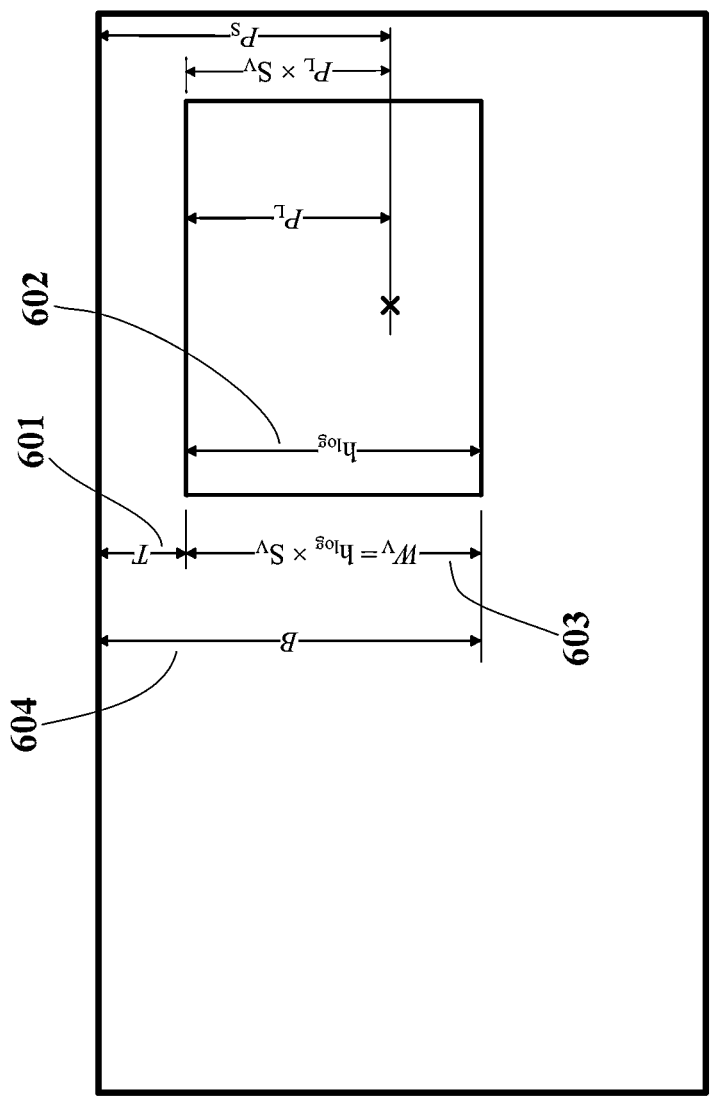
FIG. 6 illustrates the determination of logo image top and bottom boundary positions in a search image.

Analogous matching (406) and analysis (409) (410) processes are applied to the vertically-derived ratio sets. The relevant positional dimensions are shown in FIG. 6. The most distant points contributing to the matched ratio set are used to find a vertical scale factor $S_V$; the relationship of equation [9] is used to find the position T (601) of the top of the logo image; the known height of the logo image $h_{log}$ (602) is multiplied by the vertical scale factor to get the logo image height $W_V$ (603); and this is added to the top position to get the bottom position B (604).

For every vertical match event:
  A logo image top boundary position histogram $H_T$ is incremented by w at index T;
  A logo image bottom boundary position histogram $H_B$ is incremented by w at index B;
  Two logo image height histograms are incremented by the product $w \times W_V$:
    histogram $H_{HT}$ at index T, and
    histogram $H_{HB}$ at index B.
  Where: T and B are the inferred top and bottom boundary positions of the logo image in the search image; and,
    $W_V$ is the inferred height of the logo image in the search image.

A summary list of histograms is given in Table 2 below. The histograms are used to find values derived from the match data that have been consistently and confidently indicated by a significant number of match events. Such values correspond to peak values within a particular histogram. Peaks in the four logo image boundary position histograms $H_L$, $H_R$, $H_T$, and $H_B$ are detected (411) (412) (413) (414). The index values L, R, T, and B of these peaks represent candidate positions for the four boundaries of the logo image in the search image. The histograms can be filtered in known manner by the weighted combination of the values of adjacent bins prior to detecting peaks; and peaks falling below a threshold value can be ignored. If there is only one peak in each histogram then it is possible that the logo has been detected; however, each histogram may contain any number of peaks, or none.

Figure 7:
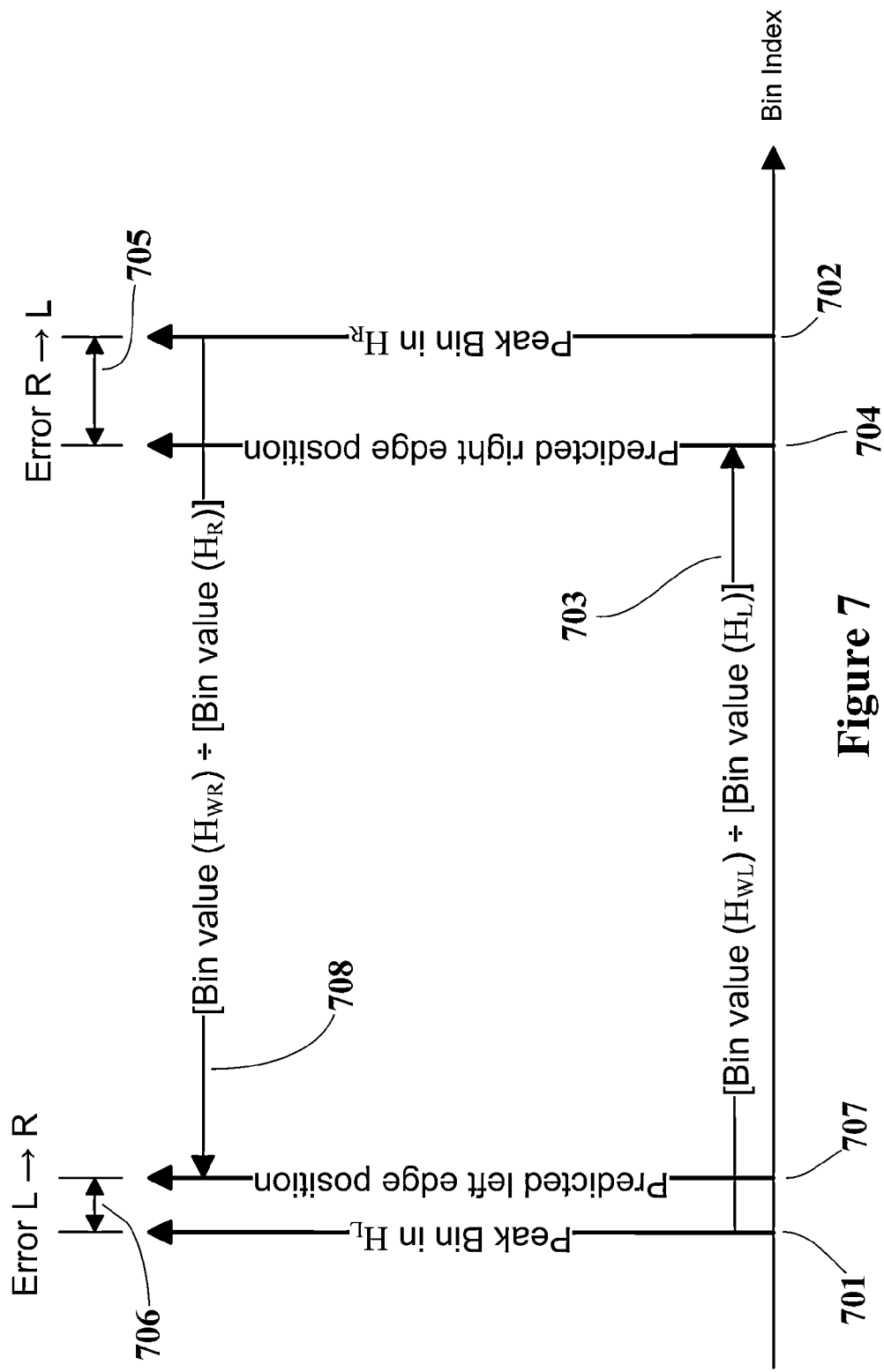
FIG. 7 illustrates a process for assessing the consistency of logo image boundary position predictions.

The data for each analysis direction is therefore processed to identify mutually consistent data in logically-related histograms. Pairs of peaks from pairs of histograms respectively indexed by opposing image boundary positions are tested to see if the data corresponding to the ratio set matches from which they were derived is consistent between one edge and the other. This process is illustrated in FIG. 7, which shows relative positions on an unquantised bin index scale.

A peak (701) in the left-boundary-position histogram $H_L$ is tested for consistency with a peak (702) in the right-boundary-position histogram $H_R$. The value of the peak bin (701) in $H_L$ is the sum of the weights w applicable to the ratio set matches that predicted a left boundary at its index position. The value of the bin in the histogram $H_{WS}$ at the same index position is a weighted sum of logo image width values, calculated from only those ratio sets matches that predict a logo image left boundary at the position in the search image corresponding to this index. A predicted width value (703) for the logo image is obtained by dividing the weighted sum of widths from $H_{WL}$ by the sum of weights from $H_L$. This width is derived only from those ratio set matches that predict a logo image left boundary at the position in the search image corresponding to the index of the peak (701) in the $H_L$ histogram.

A predicted position (704) for the right boundary of the logo image in the search image can be found by adding the predicted width (703) to the index of the peak (701). If this prediction is consistent with other ratio set matches, it will be close to a peak in the histogram $H_R$, such as the peak (702). The error distance (705) between the index of the peak (702) and the predicted position index (704), is a measure of the mutual consistency of the data contributing to the peak (701) in the histogram $H_L$ and the peak (702) in the histogram $H_R$.

Another measure of the mutual consistency of this data is the error distance (706) between the index of the peak (701) and a predicted position (707) derived from the data contributing to the peak (702) in $H_R$. This predicted width (708) is derived by dividing the value of $H_{WR}$ at the index of the peak (702), by the value of the peak bin (702). The mutual consistency of the data indexed by the left-position index (701) and the right-position-index (702) is indicated by a small magnitude of the sum $\Delta_{LR}$ of the error distances (705) and (706). Such consistency gives confidence that the index values of the peaks (701) and (702) correspond to respective left and right logo image boundary positions for the same occurrence of the logo in the search image.

Returning to FIG. 4, all the candidate logo image left boundary positions, found (411) by identifying peaks in the histogram $H_L$, are checked for consistency with all the candidate logo image right boundary positions, found (412) by identifying peaks in the histogram $H_R$. Each identified (415) pair of opposing boundary positions having low values of the above-described error magnitude sum $\Delta_{LR}$ defines a respective candidate logo horizontal size and position.

In an analogous vertical process (416) all the candidate logo image top boundary positions identified at (413) are checked for consistency with all the logo image bottom boundary positions identified at (414), and pairs having low vertical position error magnitude sums $\Delta_{TB}$ are identified. If at least one opposing pair of left and right boundaries is found at (415), and at least one pair of opposing top and bottom boundaries is found at (416), then it is likely that at least one occurrence of the logo image in the search image has been detected. However, if more than two vertical boundary pairs and/or more than two horizontal boundary pairs are found, it is then necessary to decide which horizontal pairs are associated with which vertical pairs.

The association of vertical and horizontal boundary pairs is achieved by comparing (417):
the mean vertical position of each top and bottom boundary pair with
the mean vertical position at which the horizontal distance ratios contributing to each left and right pair are matched.

Data about the vertical positions of horizontal matches contributing to particular left and right boundary positions is analysed in two further histograms. These are indexed by predicted left and right logo image boundary positions respectively, in the same way as the previously-described histograms. For every matched horizontal ratio set:
A first vertical position of horizontal match histogram $H_{yL}$ is incremented by $w \times y_{match}$ at index L; and,
A second vertical position of horizontal match histogram $H_{yR}$ is incremented by $w \times y_{match}$ at index R.
Where: $y_{match}$ is the vertical position in the search image at which the match is found.

The dimension $y_{match}$ is shown in FIG. 5 at (510); it is measured in search image vertical pixel pitches.

A weighted mean vertical logo position for a pair of left and right logo image boundary positions at L and R is found by:
dividing the value of $H_{yL}$ at index L by the value of $H_L$ at index L;
dividing the value of $H_{yR}$ at index R by the value of $H_R$ at index R; and,
averaging these two results.

This weighted mean vertical position, derived for each candidate pair of left and right logo image boundaries, is compared (417) with the respective average vertical position ½(T+8) for every candidate pair of top and bottom logo image boundaries. Where the difference between these vertical positions is less than a threshold value, the logo image is likely to be present in the search image, with its four boundaries at the candidate positions.

If there is more than one occurrence of the logo in the search image, then more than one pair of vertical and horizontal boundary pairs will be matched. And, these different occurrences of the logo may be differently scaled. However, no pairs of top and bottom logo image boundaries may be found, or no pair may give a small vertical position error when compared with a vertical position derived from horizontal ratio set data. In this case vertical logo position and scale information can be derived from the vertical positions of horizontal ratio set matches alone, without using any data from vertical analysis. This is achieved by analysing the horizontal ratio matches according to: the predicted logo boundary horizontal position; and, the respective vertical positions of the match in the logo image and the search image.

Four more histograms are constructed, each having a two-dimensional index: vertical position of the match in the logo image, and predicted horizontal boundary position.

For every matched horizontal ratio set:
A first 2-D-index vertical position of horizontal match histogram $H_{yNL}$ is incremented by $w \times y_{match}$ at index (N, L);
A second 2-D-index vertical position of horizontal match histogram $H_{yNR}$ is incremented by $w \times y_{match}$ at index (N, R);
A third 2-D-index match-count histogram $H_{NL}$ is incremented by w at index (N, L); and,
A fourth 2-D-index match-count histogram $H_{NR}$ is incremented by w at index (N, R). Where: N identifies the vertical position in the logo image at which the match is found.
In the present example there are seven vertical positions, corresponding to the lines (201) to (207) in FIG. 2.

For each candidate pair of predicted left and right logo image boundary positions, the histogram data corresponding to the highest and lowest vertical positions in the search image of horizontal ratio set matches, is used to find a corresponding vertical scale and position for the logo image.

The highest vertical position of match for a given predicted left boundary position L is found by examining the (seven in the present example) bins of $H_{NL}$ at index L, and finding the lowest N which indexes a value exceeding a threshold. Similarly the lowest vertical position of match for a given predicted left boundary position L is found by examining the bins of $H_{NL}$ at index L, and finding the highest N indexing a value exceeding a threshold. The threshold is chosen to identify values of N for which a statistically significant number of matches have been found.

The highest and lowest positions of match corresponding to a given predicted right boundary position can be found in a similar way from the histogram $H_{NR}$. The highest position derived from $H_{NL}$ can be averaged with the highest position derived from $H_{NR}$ to obtain a vertical position applicable to the associated pair of left and right logo image boundary positions.

Figure 8:
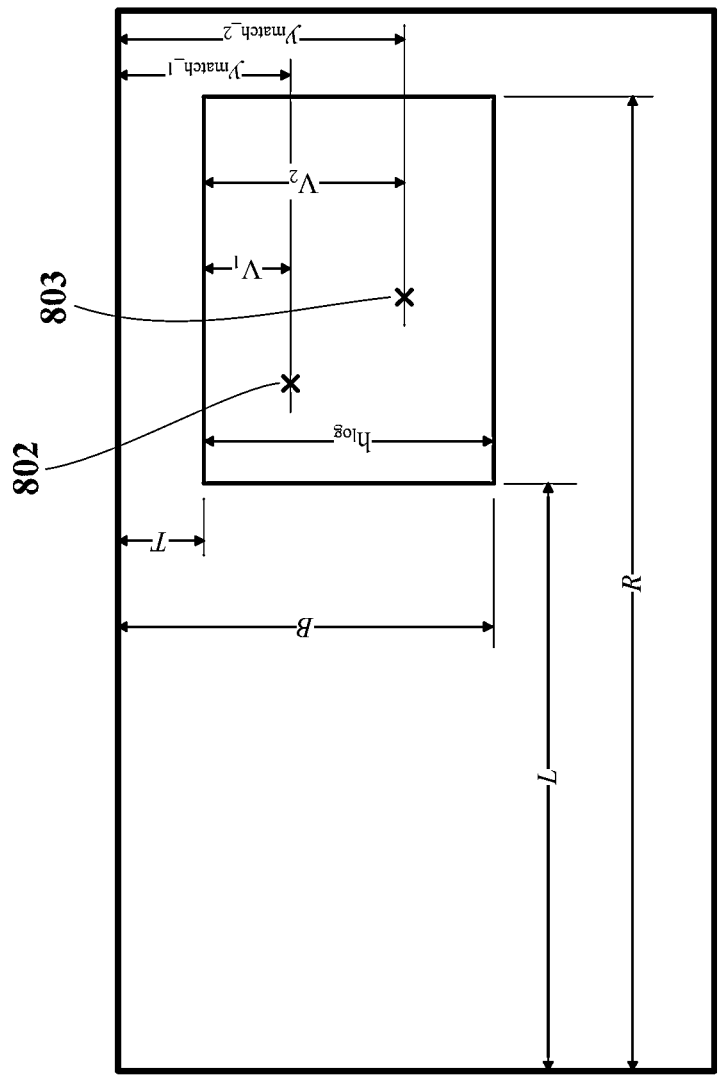
FIG. 8 illustrates an alternative process for determining top and bottom logo image boundary positions.

FIG. 8 shows the derivation of the vertical position and scale of the logo from the highest and lowest match positions. The highest horizontal distance ratio match position (802) is $y_{match\_1}$ search image pixel pitches from the top of the search image; it lies on one of the horizontal lines through the logo image, chosen when the logo image signature was created. Its position in the logo image, $V_1$ logo image pixel pitches below the top of the logo image is therefore known. Similarly, the lowest match position is $y_{match\_2}$ pixels from the top of the search image at the point (803), which is $V_2$ pixels from the top of the logo image.

The vertical scaling factor $S_V$ of the logo is then given by:

$$S_V = (y_{match\_2} - y_{match\_1}) \div (V_2 - V_1) \quad [10]$$

The respective vertical positions mid way between the match positions are:
½($y_{match\_2} + y_{match\_1}$) in the search image; and,
½($V_2 + V_1$) in the logo image.

The height of the logo image, $h_{log}$ pixels, is known from the signature creation process, and so the positions of the top and bottom logo image boundaries in the search image can be calculated from the following equations:

$$T = \tfrac{1}{2}(y_{match\_2} + y_{match\_1}) - S_V \times \tfrac{1}{2}(V_2 + V_1) \quad [11]$$

$$B = T + (S_V \times h_{log}) \quad [12]$$

Where: T and B are in units of search image vertical pixel pitches.

These boundary positions have been calculated without using any output from the step (416), and can therefore be used if no paired top and bottom boundary positions are found in step (416).

Thus each pair of left and right logo image boundary positions identified in the pairing process (415) is associated with a corresponding pair of top and bottom boundary positions. The top and bottom boundary position being identified either: by pairing with boundary pairs identified in the pairing process (416); or, by using the vertical positions of horizontal ratio set matches as described above. This process will identify multiple occurrences of the sought logo in the search image, even if they are differently-scaled.

In a final validation stage (418), each of the rectangular regions defined by an associated set of left, right, top and bottom boundaries, is evaluated by summing the respective weights w of ratio set matches that occur within it. Weights from both vertical and horizontal ratio set matches are summed, and the respective result for each candidate rectangle is compared with a respective threshold that depends on the characteristics of the particular logo that is to be detected, and the respective horizontal and vertical scaling factors $S_H$ and $S_V$ for the summed rectangle.

The number of ratio set matches for a particular logo image will depend on the number of ratio sets used to characterise the logo, and the respective similarities of rows of pixels and of columns of pixels in the logo image. For example, horizontal matches for the edge positions (263) and (273) in FIG. 1 logo will be found on all rows of pixels falling between the vertical positions of the lines (206) and (207).

To find the threshold value for a particular logo image, it is analysed vertically and horizontally using its own signature, and the weighted number of matches is counted. This count value can conveniently be included in the logo signature data input to a logo detection process. The threshold for verification of the detection of a particular logo is proportional to this weighted count of matches, and is scaled according to the area scaling factor $S_H \times S_V$ so as to allow for the higher or lower numbers of rows and columns of pixels in the search image.

The output of the logo detection process comprises the size(s) and position(s) of rectangles having respective numbers of edge position ratio set matches within them exceeding the respective threshold.

There are other embodiments of the claimed invention. For example, the lines across the logo image on which edge positions are specified need not be equally spaced, and their positions can be chosen so as to pass through particularly characteristic parts of the logo. The number of vertical lines may be different from the number of horizontal lines. Only vertical ratio sets, or only horizontal ratio sets, may be matched in the analysis process; either the horizontal positions of vertical matches; or, the vertical positions of horizontal matches, can be used to find the respective edges in the orthogonal direction. It may be known that a particular logo can be detected reliably by only horizontal matches, or only vertical matches. It may be known that logos only occur within a particular region of the search image so that only that region need be analysed. The scaling of the logo may be known, so that only distance ratios consistent with that scale are used to find logo position information.

Because the logo is characterised by a sequence of up to six edge positions, the detection may be impaired for logos which are transparent, or which have 'holes' through which edges from the background appear. The effect of a single spurious edge in a sequence of edge positions can be eliminated by modifying the distance ratios that are compared. For example, an edge position characterised by its distance from three preceding edges can be detected by measuring the distances of a candidate edge from four preceding edges, and testing three additional match criteria that allow for a spurious edge between any of the 'genuine' edges. This is shown in FIG. 9.

The previously-described distance ratios for an edge (901) preceded by three edges are shown at (900). Equivalent distance ratios (910) are shown for the case where a spurious edge (911) occurs immediately before the characterised edge position (912). Equivalent distance ratios (920) are applicable to the case where a single spurious edge (921) occurs before the first preceding edge; and, equivalent distance ratios (930) apply to the case where a single spurious edge occurs before the second preceding edge. The characterised edge can thus be detected by testing the three ratio sets (910), (920) and (930) against a sequence of five detected edge positions in the query image. Typically the match acceptability threshold for the spurious edge cases would be higher than the threshold for a match without the presence of a spurious edge.

Suitable additional distance ratio comparisons can also deal with the case where one edge in a sequence is missed. FIG. 10 shows the distance ratios (1000) applicable to an edge (1001) characterised by distance ratios to three preceding edges. (This is the same as shown at (901) and (900) in FIG. 9.) The effect of the non-detection of the first preceding edge is shown at (1010); and the effects of the respective non-detection of the two other preceding edges are shown at (1020) and (1030). It can be seen that, in each case, only one of the three ratios in the ratio set is unaffected by the failure to detect one of the preceding edges. However, a match between any one of the modified ratios and the respective corresponding ratio derived from the logo image is evidence that the characterised edge has been found in the search image.

Figure 9:
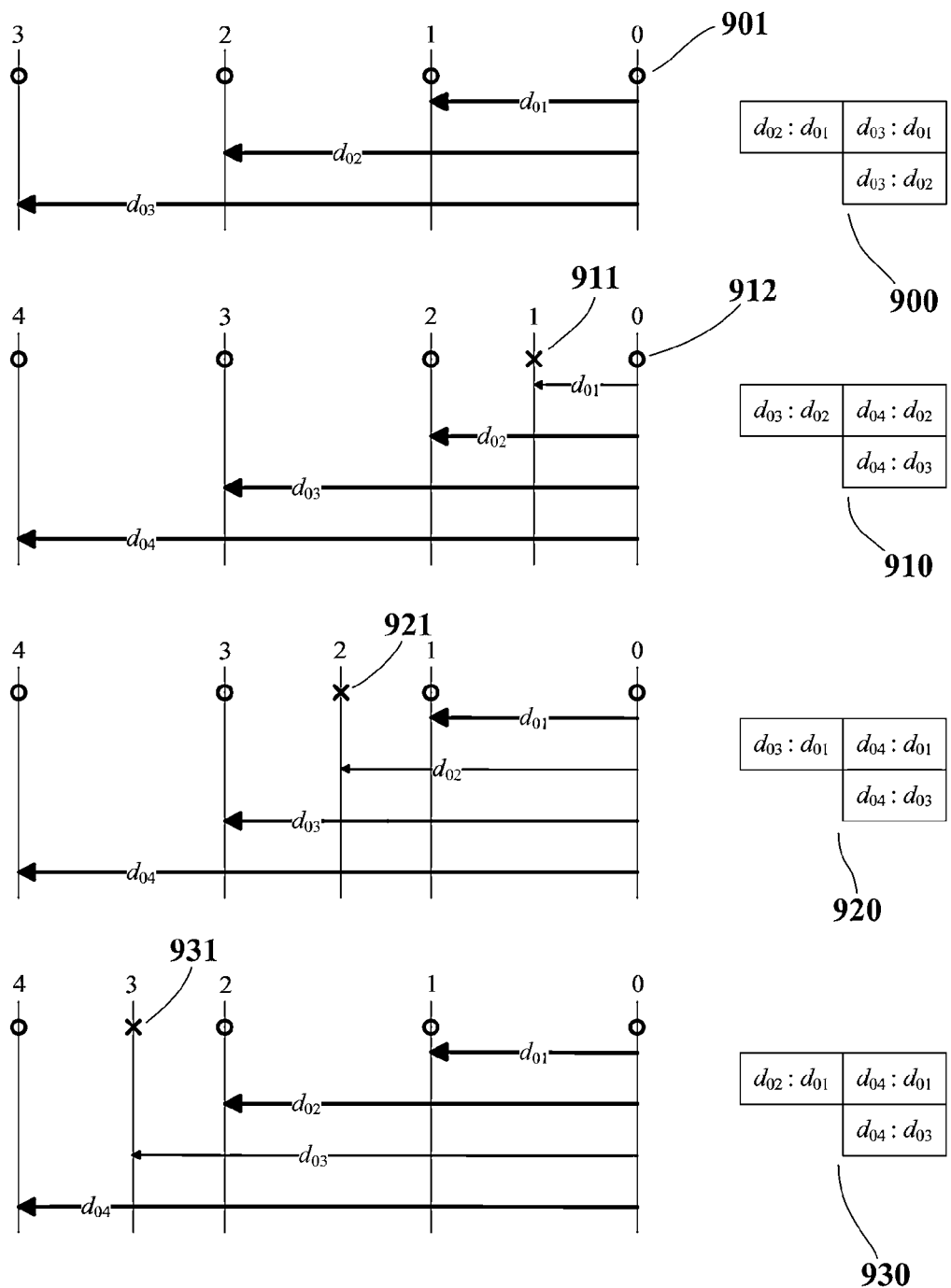
FIG. 9 illustrates the effect of spurious edges on ratios of distances between edges.
Figure 10:
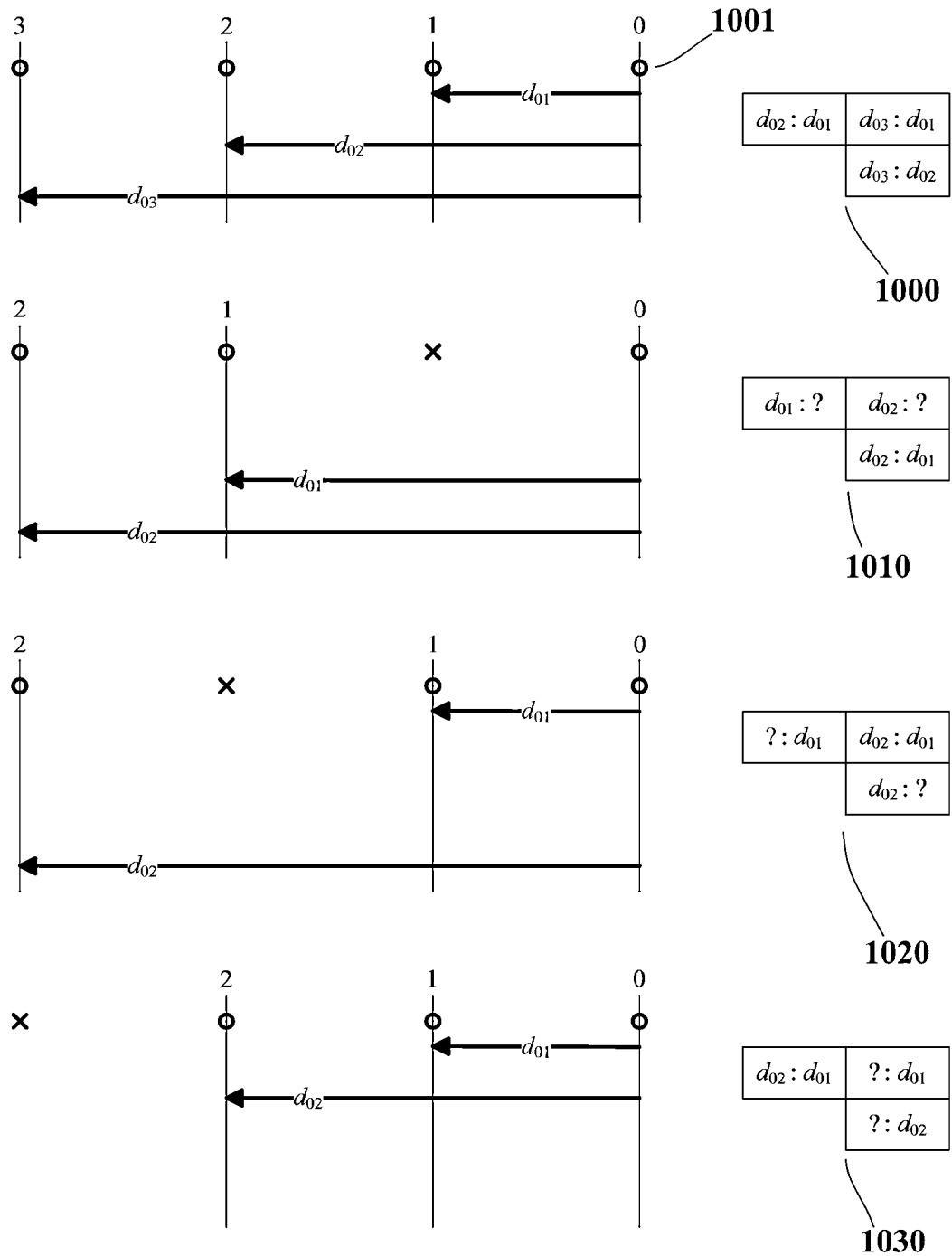
FIG. 10 illustrates the effect of missed edges on ratios of distances between edges.

For simplicity, FIGS. 9 and 10 show an edge characterised by three preceding edges. The same principles can be applied to edges characterised by more than three preceding edges. To deal with one spurious edge, one modified set of distance ratios must be compared for each characterising preceding edge. For example, an edge characterised by six preceding edges would need six additional sets of fifteen distance ratios to be compared.

To deal with the case of one missed edge, at least one distance ratio becomes invalid, and at least some of the other ratios need to be calculated differently, for each characterising edge. For example, an edge characterised by six preceding edges would need six additional comparisons; and the additional comparisons involve fewer than the fifteen distance ratios normally used.

Several decisions in the detection of logos according to the invention involve thresholds. The values of these will inevitably depend on the number system used to define the values of pixels and the particular physical quantity that the pixel values represent. Suitable values can be found by 'training' a system with known data. However, as described above, the analysis of the logo image against its own 'signature' is a very useful scaling parameter for adapting a detection process to the characteristics of a particular logo. The number of matches of edge positions will depend on the similarity of different regions within a particular logo, and the size of the logo in the search image. This size is usually unknown when the edge position histograms are analysed to detect peaks, however the width values derived from edge distances are available and can be used to scale a histogram-peak detection threshold.

The invention can be used to detect moving logos by characterising edge position data for particular frames of a moving logo sequence and matching these in particular frames of a search image sequence.

Although the above description is based on orthogonally sampled images, the invention may also be applied to any two-dimensional spatial sampling structure. For example, instead of horizontal and vertical analysis two different diagonal directions could be used; the only constraints are that that edge positions are defined in two sampling dimensions, and that the same sampling dimensions are used for the sampling of the logo image and the search image.

TABLE 2

| Histogram | Histogram Symbol | Bin Increment | Index |
|---|---|---|---|
| Logo image left boundary position | $H_L$ | Weight w | Predicted left boundary position L |
| Logo image right boundary position | $H_R$ | Weight w | Predicted right boundary position R |
| Logo image width indexed by L | $H_{WL}$ | Weighted width prediction $w \times W_H$ | Predicted left boundary position L |
| Logo image width indexed by R | $H_{WR}$ | Weighted width prediction $w \times W_H$ | Predicted right boundary position R |
| Logo image top boundary position | $H_T$ | w | Predicted top boundary position T |
| Logo image bottom boundary position | $H_B$ | w | Predicted bottom boundary position B |
| Logo image height indexed by T | $H_{HT}$ | Weighted height prediction $w \times W_V$ | Predicted top boundary position T |
| Logo image height indexed by B | $H_{HB}$ | Weighted height prediction $w \times W_V$ | Predicted bottom boundary position B |
| Vertical position of horizontal match indexed by L | $H_{yL}$ | Weighted vertical position $w \times y_{match}$ | Predicted left boundary position L |
| Vertical position of horizontal match indexed by R | $H_{yR}$ | Weighted vertical position $w \times y_{match}$ | Predicted right boundary position R |
| Vertical position of horizontal match indexed by (N, L) | $H_{yNL}$ | $w \times y_{match}$ | (N, L) |
| Vertical position of horizontal match indexed by (N, R) | $H_{yNR}$ | $w \times y_{match}$ | (N, R) |
| Weighted match-count indexed by (N, L) | $H_{NL}$ | w | (N, L) |
| Weighted match-count indexed by (N, R) | $H_{NR}$ | w | (N, R) |

What is claimed is:

1. A method of comparing in a processor a logo image with a search image so as to detect the presence in the search image of a logo portrayed in the logo image, the method comprising:
   determining the positions of logo edges within a sequence of logo edges along a first spatial sampling direction in the logo image;
   representing said logo edges by ratios of distances between the respective logo edge and a plurality of preceding logo edges;
   determining the positions of search edges within a sequence of search edges along a first spatial sampling direction in the search image;
   representing said search edges by ratios of distances between the respective search edge and a plurality of preceding search edges; and
   comparing said represented logo edges with said represented search edges;
   wherein first and second logo image boundary positions are calculated from each matched sequence and respective frequency of occurrence measures are calculated for quantised values of first and second logo image boundary positions;
   wherein a logo image width is calculated from each matched sequence and widths are summed for each quantised value of first logo image boundary position and for each quantised value of second logo image boundary position;

wherein a detected logo size and position is derived from an associated pair of first and second logo image boundary positions selected according to the difference between their respective quantised positions and their associated sums of width values; and wherein the presence in the search image of a logo portrayed in the logo image is detected when a weighted measure of the number of matches between sequences of edges at selected positions in the logo image and sequences of edges within a region in the search image bounded by detected logo image boundary positions exceeds a threshold.

2. A method according to claim 1 wherein a sequence of edges at a selected position in the logo image is compared with sequences of edges from a plurality of positions in the search image and the position of the portrayed logo in the search image is determined from the position of a match between the respective sequences of edges.

3. A method according to claim 1 wherein a scaling factor of the logo image relative to the search image in the direction of the said sequence is determined.

4. A method according to claim 1 wherein the frequency of occurrence of matches between sequences of edges along a first spatial sampling direction in the logo image is analysed according the position of the respective match along a second spatial sampling direction in the logo image.

5. A method according to claim 4 wherein match data associated with frequently occurring match positions is used to derive a logo size and position from an associated pair of first and second logo image boundary positions along the said second spatial sampling direction.

6. A method of comparing in a processor a logo image with a search image so as to detect the presence in the search image of a logo portrayed in the logo image, the method comprising:
    determining the positions of logo edges within a sequence of logo edges along a first spatial sampling direction in the logo image;
    representing said logo edges by ratios of distances between the respective logo edge and a plurality of preceding logo edges;
    determining the positions of search edges within a sequence of search edges along a first spatial sampling direction in the search image;
    representing said search edges by ratios of distances between the respective search edge and a plurality of preceding search edges; and
    comparing said represented logo edges with said represented search edges;
    wherein the frequency of occurrence of matches between sequences of edges along a first spatial sampling direction in the logo image is analysed according the position of the respective match along a second spatial sampling direction in the logo image;
    wherein match data associated with frequently occurring match positions is used to derive a logo size and position from an associated pair of first and second logo image boundary positions along the said second spatial sampling direction; and
    wherein the presence in the search image of a logo portrayed in the logo image is detected when a weighted measure of the number of matches between sequences of edges at selected positions in the logo image and sequences of edges within a region in the search image bounded by detected logo image boundary positions exceeds a threshold.

7. A non-transient computer storage medium containing instructions adapted to cause programmable apparatus to implement a method of comparing a logo image with a search image so as to detect the presence in the search image of a logo portrayed in the logo image, comprising the steps of:
    determining the positions of logo edges within a sequence of logo edges along a first spatial sampling direction in the logo image;
    representing said logo edges by ratios of distances between the respective logo edge and a plurality of preceding logo edges;
    determining the positions of search edges within a sequence of search edges along a first spatial sampling direction in the search image;
    representing said search edges by ratios of distances between the respective search edge and a plurality of preceding search edges; and
    comparing said represented logo edges with said represented search edges;
    wherein first and second logo image boundary positions are calculated from each matched sequence and respective frequency of occurrence measures are calculated for quantised values of first and second logo image boundary positions;
    wherein a logo image width is calculated from each matched sequence and widths are summed for each quantised value of first logo image boundary position and for each quantised value of second logo image boundary position;
    wherein a detected logo size and position is derived from an associated pair of first and second logo image boundary positions selected according to the difference between their respective quantised positions and their associated sums of width values; and
    wherein the presence in the search image of a logo portrayed in the logo image is detected when a weighted measure of the number of matches between sequences of edges at selected positions in the logo image and sequences of edges within a region in the search image bounded by detected logo image boundary positions exceeds a threshold.

8. A non-transient computer storage medium containing instructions adapted to cause programmable apparatus to implement a method of comparing a logo image with a search image so as to detect the presence in the search image of a logo portrayed in the logo image; comprising the steps of:
    determining the positions of logo edges within a sequence of logo edges along a first spatial sampling direction in the logo image;
    representing said logo edges by ratios of distances between the respective logo edge and a plurality of preceding logo edges;
    determining the positions of search edges within a sequence of search edges along a first spatial sampling direction in the search image;
    representing said search edges by ratios of distances between the respective search edge and a plurality of preceding search edges; and
    comparing said represented logo edges with said represented search edges;
    wherein the frequency of occurrence of matches between sequences of edges along a first spatial sampling direction in the logo image is analysed according the position of the respective match along a second spatial sampling direction in the logo image;

wherein match data associated with frequently occurring match positions is used to derive a logo size and position from an associated pair of first and second logo image boundary positions along the said second spatial sampling direction;

wherein the presence in the search image of a logo portrayed in the logo image is detected when a weighted measure of the number of matches between sequences of edges at selected positions in the logo image and sequences of edges within a region in the search image bounded by detected logo image boundary positions exceeds a threshold.

\* \* \* \* \*